UNITED STATES PATENT OFFICE.

TERRENCE McSWEENEY, OF ALLEGHENY, ASSIGNOR OF ONE-HALF TO THOMAS A. GILLESPIE, OF PITTSBURG, PENNSYLVANIA.

COMPOSITION FOR THE MANUFACTURE OF STRUCTURAL ARTICLES.

SPECIFICATION forming part of Letters Patent No. 372,552, dated November 1, 1887.

Application filed December 15, 1886. Serial No. 221,684. (No specimens.)

*To all whom it may concern:*

Be it known that I, TERRENCE McSWEENEY, residing at Allegheny, in the county of Allegheny and State of Pennsylvania, a citizen of the United States, have invented or discovered certain new and useful Improvements in Compositions for the Manufacture of Structural Articles, of which improvements the following is a specification.

The invention herein relates to certain improvements in composition for the manufacture of structural articles—such as pipes, conduits, railroad cross ties, insulators, and other articles. Heretofore such articles have generally been made of wood, iron, or glass, and sometimes of paper, either in the form of pulp or boards mixed with other materials. The articles so manufactured are, however, not only expensive, but are also subject to rapid deterioration from exposure to atmospheric influences.

The object of the invention herein is to so combine paper pulp or board with other materials as to form a composition which, when formed into structural shapes, will resist all atmospheric influences and leakage of electricity, &c., and can be cheaply and readily formed into the desired shapes.

In carrying out my invention I take pulp formed of any suitable fiber and impregnate it with a mixture of asphaltum, rosin, and coal-tar. The composition thus formed is placed in suitable molds to give it the desired shape and then subjected to hydraulic pressure to compact it to the desired density. The asphaltum, rosin, and coal-tar are mixed together in approximately the proportions of sixty pounds of asphaltum, twenty pounds of rosin, and twenty pounds of coal-tar, the coal-tar being reduced to twenty-five per cent. of its bulk by boiling. These ingredients, after being melted and thoroughly mixed in about the proportions above stated, are mixed with the pulp in about the proportion of one part of the mixture to seven parts of the pulp. As soon as the pulp has become thoroughly mixed or impregnated with the asphaltum, rosin, and coal-tar, it is poured into suitable molds and there compressed under hydraulic pressure to the required density.

It is not practicable to use a mixture of the asphaltum and coal-tar alone for this purpose, as it cannot be sufficiently liquefied by heat, and, further, as it becomes soft and pasty at comparatively low temperature. I have, however, by experiment shown that by the addition of a certain percentage of rosin the resulting compound will become quite fluid when heated, and will therefore easily permeate the pulp or board, and when cool becomes quite hard and compact and somewhat tough, the degree of flexibility and hardness being dependent upon the percentage of rosin and coal-tar used—*i. e.*, the greater the quantity of rosin used the harder the resulting compound, and the greater the quantity of coal-tar the more flexible such compound will be.

In order to make the above-described compound sufficiently hard when used in the manufacture of articles where great hardness or rigidity is required—as, for example, in electric insulators to resist the cutting action of the wires—pulverized glass or fine sand should be added to the above compound in about the proportions of three parts of pulverized glass or fine sand, seven parts of pulp, and one part of the combined asphaltum, rosin, and coal-tar, the insulators being formed of the above mixture by compressing the same in suitable molds.

The proportions of the asphaltum, rosin, and coal-tar above stated may be considerably varied, as may also the proportions of the mixture and pulp and the mixture of pulp and pulverized glass or fine sand without departing from the spirit of my invention.

In lieu of the pulp I may use boards or sheets formed of the pulp. When the above are used I do not use the pulverized glass or fine sand, the glass and fine sand being used only for insulating purposes, the desired articles being formed by superimposing layers of the boards or sheets after passing the same through a bath of the combined asphaltum, rosin, and coal-tar.

I claim herein as my invention—

A composition for the manufacture of structural articles consisting of a mixture of asphaltum, rosin, and coal-tar, paper-pulp, and pulverized glass or fine sand, substantially as set forth.

In testimony whereof I have hereunto set my hand.

TERRENCE McSWEENEY.

Witnesses:
DARWIN S. WOLCOTT,
R. H. WHITTLESEY.